United States Patent
Freeman et al.

(10) Patent No.: US 6,721,885 B1
(45) Date of Patent: Apr. 13, 2004

(54) REDUCING START-UP TIME AND AVOIDING CUSTOMER-INDUCED SYSTEM FAILURES FOR PERSONAL COMPUTERS

(75) Inventors: Joseph Wayne Freeman, Raleigh, NC (US); Joseph Franklin Garvey, Cary, NC (US); Steven D. Goodman, Raleigh, NC (US); William Fred Keown, Jr., Raleigh, NC (US); Randall S. Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 09/658,130

(22) Filed: Sep. 8, 2000

(51) Int. Cl.[7] ............................................. G06F 15/177
(52) U.S. Cl. ............................. 713/2; 713/100; 713/320
(58) Field of Search ................................. 713/1, 2, 100, 713/320, 322, 323

(56) References Cited

U.S. PATENT DOCUMENTS

| | | | |
|---|---|---|---|
| 5,634,137 A | 5/1997 | Merkin | |
| 5,912,621 A | 6/1999 | Schmidt | |
| 5,940,586 A | 8/1999 | Bealkowski | |
| 5,974,546 A | 10/1999 | Anderson | |
| 6,092,135 A | * 7/2000 | Kwon | 710/104 |
| 6,191,503 B1 | * 2/2001 | Kitten et al. | 307/112 |
| 6,289,456 B1 | * 9/2001 | Kuo et al. | 713/200 |
| 6,434,697 B1 | * 8/2002 | Leyda et al. | 713/2 |
| 6,519,698 B1 | * 2/2003 | Leyda et al. | 713/2 |

* cited by examiner

Primary Examiner—Dennis M. Butler
(74) Attorney, Agent, or Firm—Bracewell & Patterson, LLP; Carlos Munoz-Bustamante

(57) ABSTRACT

Disclosed is a method for reducing power-up time and avoiding customer-induced failures of computer systems during power-up. An intrusion switch, which is connected to the inside frame of the computer system is utilized. The intrusion switch signals the BIOS of the computer system whenever the cover of the computer's system unit is opened. The BIOS controls the POST operation during power-up of the computer system. During an initial power-up of the computer system, the POST configuration code examines and configures the hardware and sets the applicable registers, etc. At the end of the POST configuration code, the register values are stored in non-volatile storage. During a subsequent power-up of the computer system, a check is made to see if the cover of the system had been opened. When the cover has not been opened, the BIOS assumes that no changed has occurred in the hardware configuration and the BIOS restores the register values from non-volatile storage without completing the POST operation. When the cover has been opened, the BIOS discards the register values and initiates the POST operation, i.e., a full configuration operation is performed and new values stored in the registers and non-volatile storage element.

16 Claims, 4 Drawing Sheets

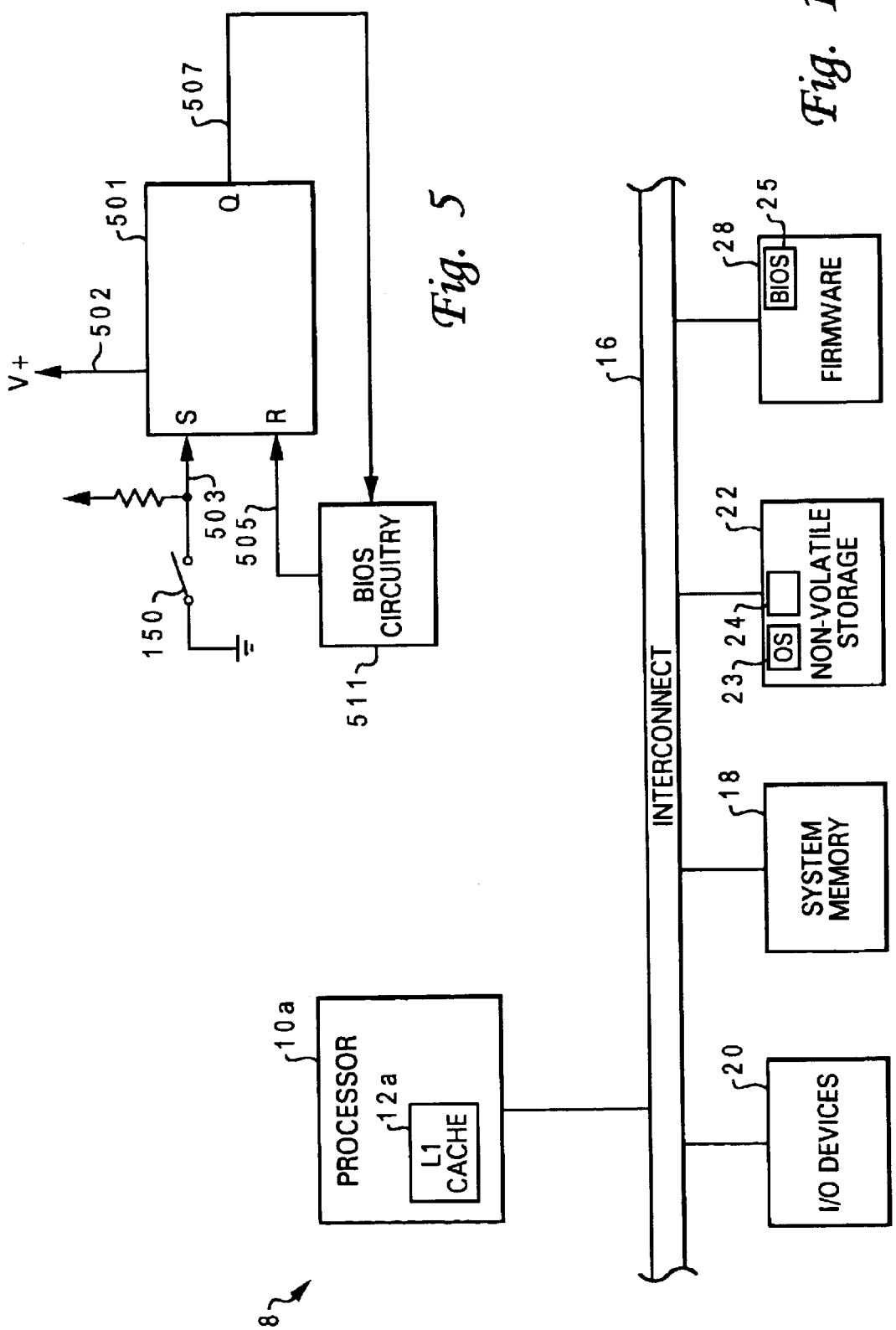

REDUCING START-UP TIME AND AVOIDING CUSTOMER-INDUCED SYSTEM FAILURES FOR PERSONAL COMPUTERS

BACKGROUND OF THE INVENTION

1. Technical Field

The present invention relates in general to computer systems and in particular to power-on operations of computer systems. Still more particularly, the present invention relates to a method that reduces start-up time and/or customer-induced start-up failures for computer systems.

2. Description of the Related Art

Personal computers typically take several seconds to be ready for operation (i.e., boot up) after a user pushes a button to turn the computer system on. Users of these computer systems would prefer to eliminate the wait-on-boot delay time and have their computer systems operate like other household appliances that are ready for use almost immediately after being powered on.

When a computer system is turned on from a cold power off (i.e., "S5" state when all power to all parts of the system is turned off), the current practice in the industry is to have the Basic Input/Output System (BIOS) code contained in the Read Only Memory (ROM) of the computer system perform a Power-On Self-Test (POST) operation to determine the configuration of the system's hardware. The POST is a configuration code residing in the ROM, which initializes all the internal hardware and external hardware connected to the computer and tests and places the hardware in an operational state. The purpose of these checks is to initialize (or set up) various hardware control registers to enable the computer system to work properly with the current hardware configuration. For example, the POST operation determines what memory modules are present in the system, scans the optional card bus (the PCI bus in current practice) and assigns required system resources to each card. The POST operation also checks for the presence of disk drives and various interfaces—IDE, SCSI, internal USB, etc., sets up control registers to work with the interfaces found, and sets up System Management BIOS (SMBIOS) tables.

The BIOS program then normally checks drive A of the computer to determine if it contains a formatted floppy disk. If a floppy disk is mounted in the drive, the BIOS program searches specific locations of the disk to determine if a valid boot record exists. If the floppy drive is empty, the BIOS boot program checks the hard drive, typically the C drive, for the system files.

One visible limitation to the standard method of starting the computer is that the process is rather time consuming. The full memory discovery and configuration may take over 5 seconds on a system utilizing RAMBUS technology, and disk drive discovery may take in excess of 20 seconds on IDE or SCSI interfaces. In most cases, these routines provide the same results (i.e., the same control register settings are provided) for a system that has not had any changes to its hardware configuration since the last POST operation was performed.

Running the POST configuration code at each cold start up is useful in some limited situations such as development testing and manufacturing, when the computer system's hardware configuration may be changed between each power up event. However, for the end users of the computer system, such behavior offers little benefit since changes to the computer system's hardware configuration are typically vary rare or infrequent.

One development that has reduced the wait time for power up of a computer system is the return from low power "save to RAM" (also referred to as "S3") state as defined by Microsoft Corporation. As a power saving measure, all power to the computer system, except for power to the memory modules, are shut down. When the user performs some action such as pressing a key on the keyboard, the BIOS quickly restores the control registers to the values they contained before S3 state was entered.

In S3 state, since power has been removed from most of the computer system, the computer system appears to be totally off as there is nothing displayed on the monitor, no fans running, no sound from the disk drives, etc. The user may mistakenly think the system is completely powered off when it is actually in S3 state. Thus, the user may attempt to make changes to the hardware configuration, such as adding or changing an adapter card.

If the user makes a change to the hardware configuration while the computer system is in S3 state, the operating system would probably crash when the user attempts to bring the system back up since the register values of hardware resources that had been originally stored by the computer system are now invalid. There would probably not be any electrical damage to the system because power has been removed from most of the system; however, the consequences of such a crash to the end user may be severe.

The present invention recognizes that it would therefore be desirable to have a method, system, and program product for reducing the power-on time of a computer system. It would be further desirable if said method, system, and program product further reduced customer-induced system failures during power-on from S3 state. These and other benefits are provided in the present invention.

SUMMARY OF THE INVENTION

Disclosed is a method for reducing power-up time and avoiding customer-induced failures of computer systems during power-up. An intrusion switch, which is connected to the inside frame of the computer system is utilized. The intrusion switch signals the BIOS of the computer system whenever the cover of the computer's system unit is opened. The BIOS controls the POST operation during power-up of the computer system. During an initial power-up of the computer system, the POST configuration code examines and configures the hardware and sets the applicable registers, etc. At the end of the POST configuration code, the register values are stored in non-volatile storage. During a subsequent power-up of the computer system, a check is made to see if the cover of the system had been opened. When the cover has not been opened, the BIOS assumes that no change has occurred in the hardware configuration and the BIOS restores the register values from non-volatile storage without completing the POST operation. When the cover has been opened, the BIOS discards the register values and initiates the POST operation, i.e., a full configuration operation is performed and new values stored in the registers and non-volatile storage element.

In another embodiment, power-up of the computer system occurs from S3 state. When the computer system returns from an S3 state, and the cover of the system has been opened, a full power-up reconfiguration is performed followed by a cold boot (i.e., reloading from memory) of the operating system so that the configuration changes would be addressed properly in the configuration registers and the operating system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 1 depicts a block diagram of a data processing system, in which a preferred embodiment of the present invention may be implemented;

FIG. 5 illustrates a schematic diagram of a set-reset latch coupled to the intrusion switch circuit of the computer system in accordance with one embodiment of the invention.

DESCRIPTION OF AN IllUSTRATIVE EMBODIMENT

Figure 2A:
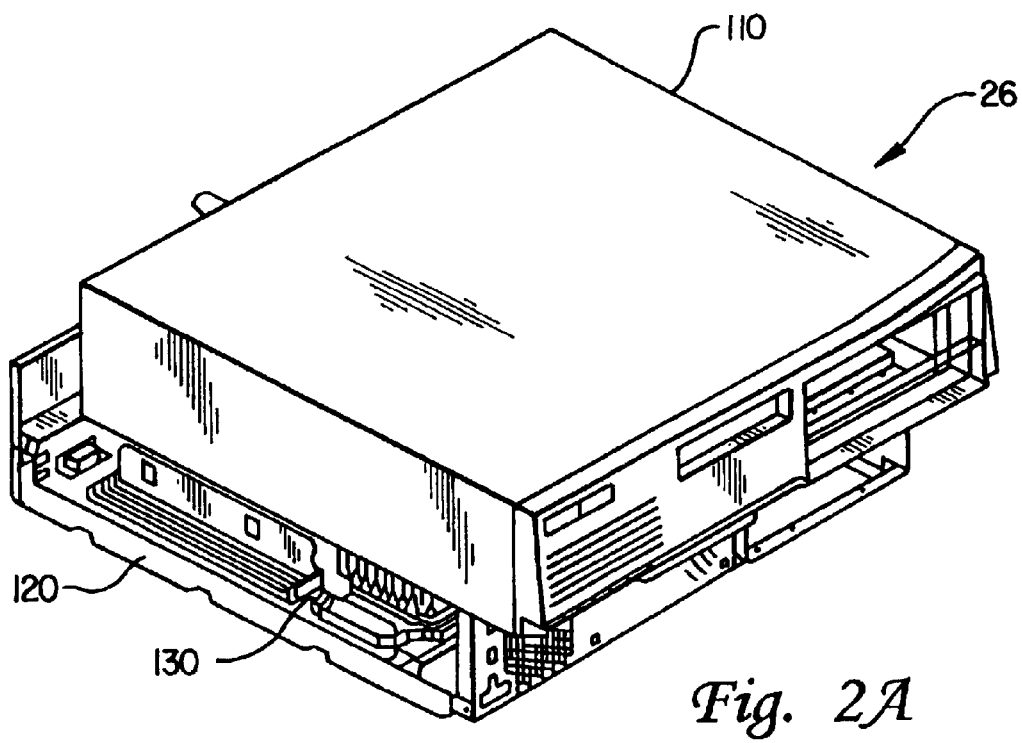
FIGS. 2A and 2B illustrate perspective views with partially removed covers of a conventional and a tower configuration of the system unit of a data processing system.

The present invention is directed to a method and system for reducing both power-on time and customer-induced failures of computer systems. In particular, the present invention expands the functionality of the computer's BIOS utility utilizing a built-in intrusion switch that is coupled to the inside frame of the computer system. The intrusion switch opens and closes a switch circuit that provides a signal to the BIOS, by which the BIOS determines when to perform a cold power-on (i.e., full POST operation) versus a quicker power-on utilizing previously stored register values of the hardware configuration.

The invention is implemented in a central processing unit (CPU) or system unit of a computer system as illustrated in the figures. The invention may, however, be implemented in other types of computer system configurations, so, while the present invention may be described with references to these figures, these references should not be construed in a limiting sense.

With reference now to the figures, and in particular with reference to FIG. 1, there is illustrated a high level block diagram of a computer system in accordance with the present invention. As depicted, computer system 8 includes at least one processor 10. Processor 10 preferably comprises one of the PowerPC™ line of microprocessors available from International Business Machines Corporation. Those skilled in the art will appreciate that other suitable processors can be utilized. Processor includes conventional registers, instruction flow logic and execution units utilized to execute program instructions, and an associated on-board cache.

As illustrated, computer system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into system memory 18 in response to computer system 8 being powered on. Of course, those skilled in the art will appreciate that computer system 8 can include many additional components which are not shown in FIG. 1, such as serial and parallel ports for connection to network or attached devices and a memory controller that regulates access to system memory 18, etc.

Interconnect (system bus) 16, which can comprise one or more buses or a cross-bar switch, serves as a conduit for communication transactions between processors 10a–10n, system memory 18, I/O devices 20, and nonvolatile storage 22.

Operating system (OS) 23 resides within machine readable media to direct the operation of computer system 8. Any suitable machine-readable media may retain the OS, such as RAM, ROM, SCSI disk drive, and other disk and/or tape drive(e.g. magnetic diskette, magnetic tape, CD-ROM, optical disk, or other suitable storage media). Also, any suitable OS may direct the processing unit of the computer system 8.

Further, computer system 8 preferably includes at least one software application (program product) 24 that resides within machine readable media. The software application 24 may be accessible by operating system 23, or may be incorporated into an operating system control program. Additionally, computer system 8 comprises firmware 25, including BIOS code (or BIOS utility) 28 that when executed on the processing unit 10 carry out POST configuration operations and other functions of the present invention as described herein.

Figure 2B:
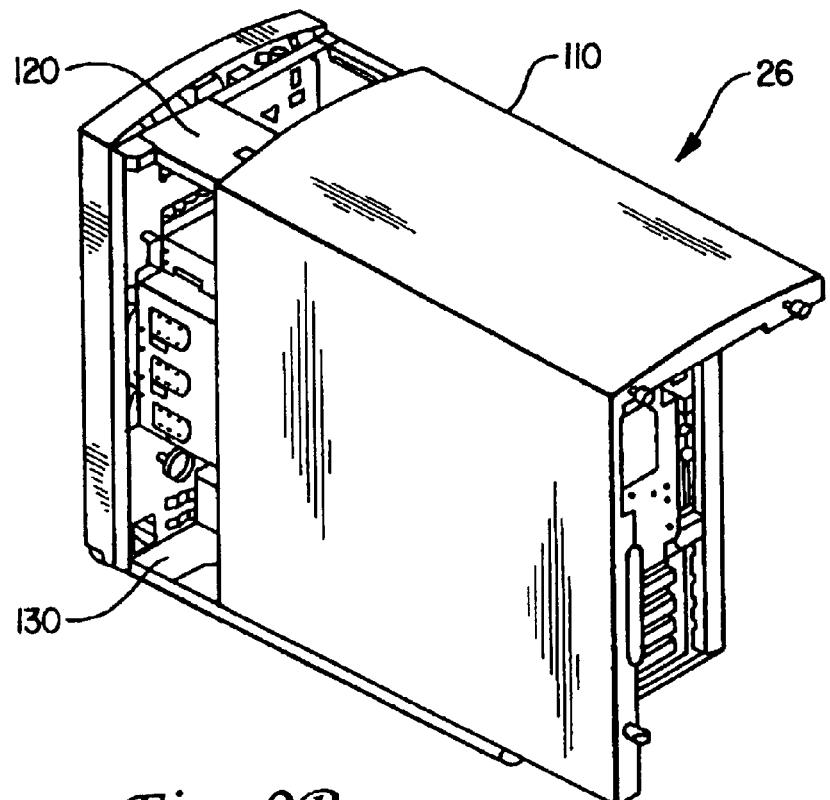

The various components illustrated in FIG. 1 are typically housed within a system unit, which may be coupled to external I/O devices, such as a mouse, keyboard, monitor, etc. Turning now to FIGS. 2A and 2B, there are illustrated two configurations of system unit 26 with a cover 110 and base unit 120, which includes a frame 130. As illustrated, cover 110 is partially removed from base unit to show the internal components of system unit 26. This invention takes advantage of a switch and associated circuitry that is fitted to frame 130. The switch, also referred to as an "intrusion switch" is common in the industry as a way of detecting theft or unauthorized configuration changes. For example, U.S. Pat. No. 5,912,621 discloses a computer cabinet tamper detection system that includes a switch utilized to alert the user when the chassis is safe or unsafe (i.e., closed or opened). The present invention utilizes the intrusion switch within a switch circuit that is monitored by (or, in another embodiment, provides an input signal to) BIOS to provide a different functionality related to powering-up of the computer system.

Figure 3A:
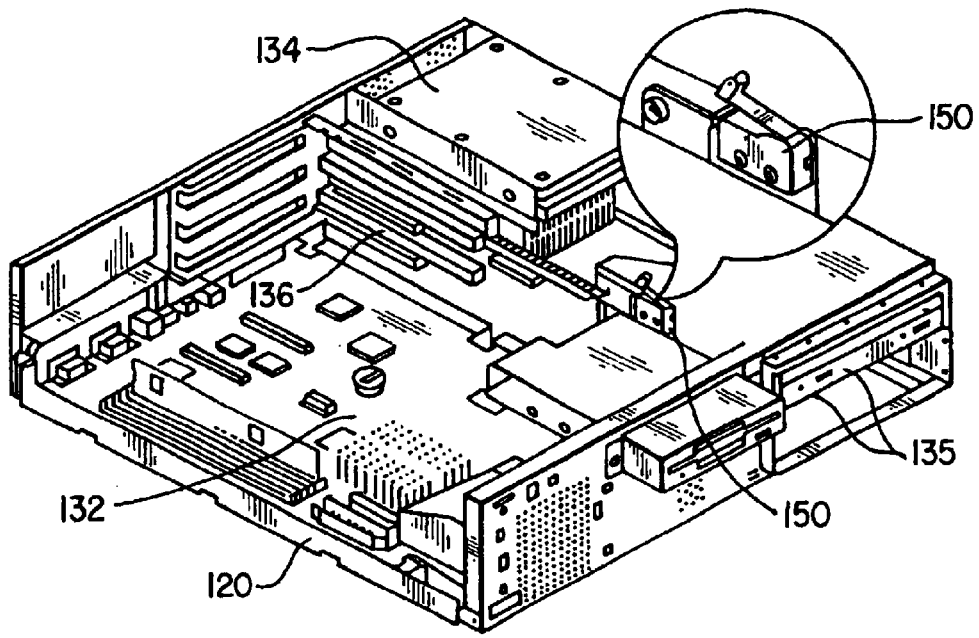
FIGS. 3A and 3B illustrates perspective views of the system units of FIGS. 2A and 2B with their covers removed to reveal the internal hardware components including the intrusion switch in accordance with two implementations of the present invention.
Figure 3B:
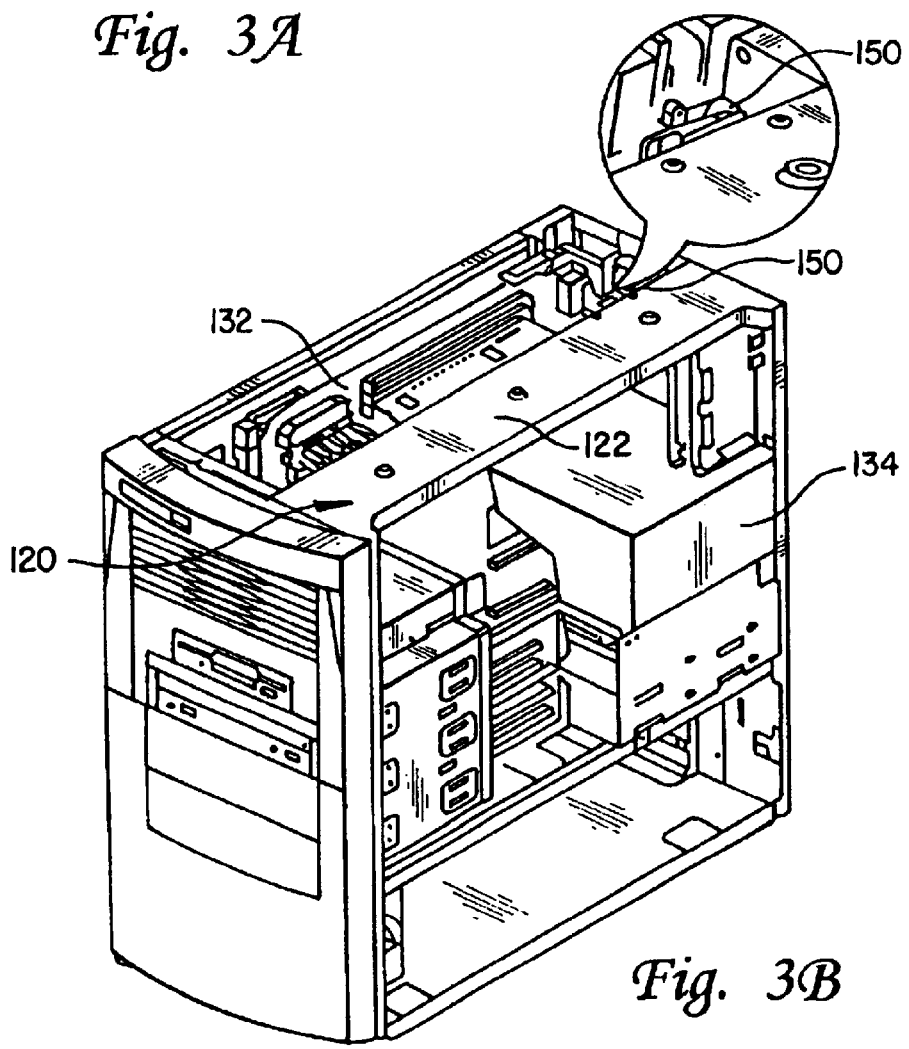

FIGS. 3A and 3B depict placement of the switch and other electronic hardware components in the conventional and tower configurations of system unit 26, respectively. The components include mother board 132, hard drive 134, disk drives 135, and daughterboard slots 136. Intrusion switch 150 is also illustrated. In the present invention, intrusion switch 150 is attached to the part of the inner frame 120 that supports hard drive 134 and disk drives 135. In the tower configuration, switch 150 is attached to beam 122 that extends from the front to the back of the computer. Other locations for intrusion switch 150 are possible. Preferably, intrusion switch is located where it can not be manually held in a closed position during the opening of the cabinet and will detect the cabinet opening as soon as the cover 110 has begun to be removed.

In the preferred embodiment, intrusion switch 150 detects when cover 110 is removed from frame 120 and signals a modified BIOS utility via a switch circuit illustrated in FIG. 5. FIG. 5 illustrates a set-reset latch circuit which indicates when system unit 26 has been opened. The switch is in a closed position when cover 110 is on the frame 120 and the switch is in an open position when cover 110 is removed from frame 120 or when the system unit 26 is open. Set-reset (SR) latch 501 is connected to a power source 502, which is the computer's main power supply when the computer is on or in S3 state. However, when the computer is completely turned off, power source 502 is a battery, which is dynamically coupled to SR latch 501 when the main power supply is turned off and decoupled when the main power supply is turned back on.

SR latch 501 receives a logic high level at set input (S) 503 whenever switch 150 opens. Set input 503 sets latch output (Q) to a high logic level (i.e., logic 1). Once system unit 22 is opened, the output of SR latch 501 becomes a "1" and is transmitted to the BIOS circuitry 511. When a subsequent power-on occurs, the BIOS utility checks the value of the output and, if it is a 1, the BIOS triggers the full POST operation. Once the full POST operation is triggered, the BIOS circuitry 511 activates reset input (R) 505 which resets SR latch 501 to a low logic level, "0." A "0" value as the output from SR latch 501 indicates to BIOS utility 28 that system unit 26 has not been opened prior to power-on and a full POST is not required.

Figure 4:
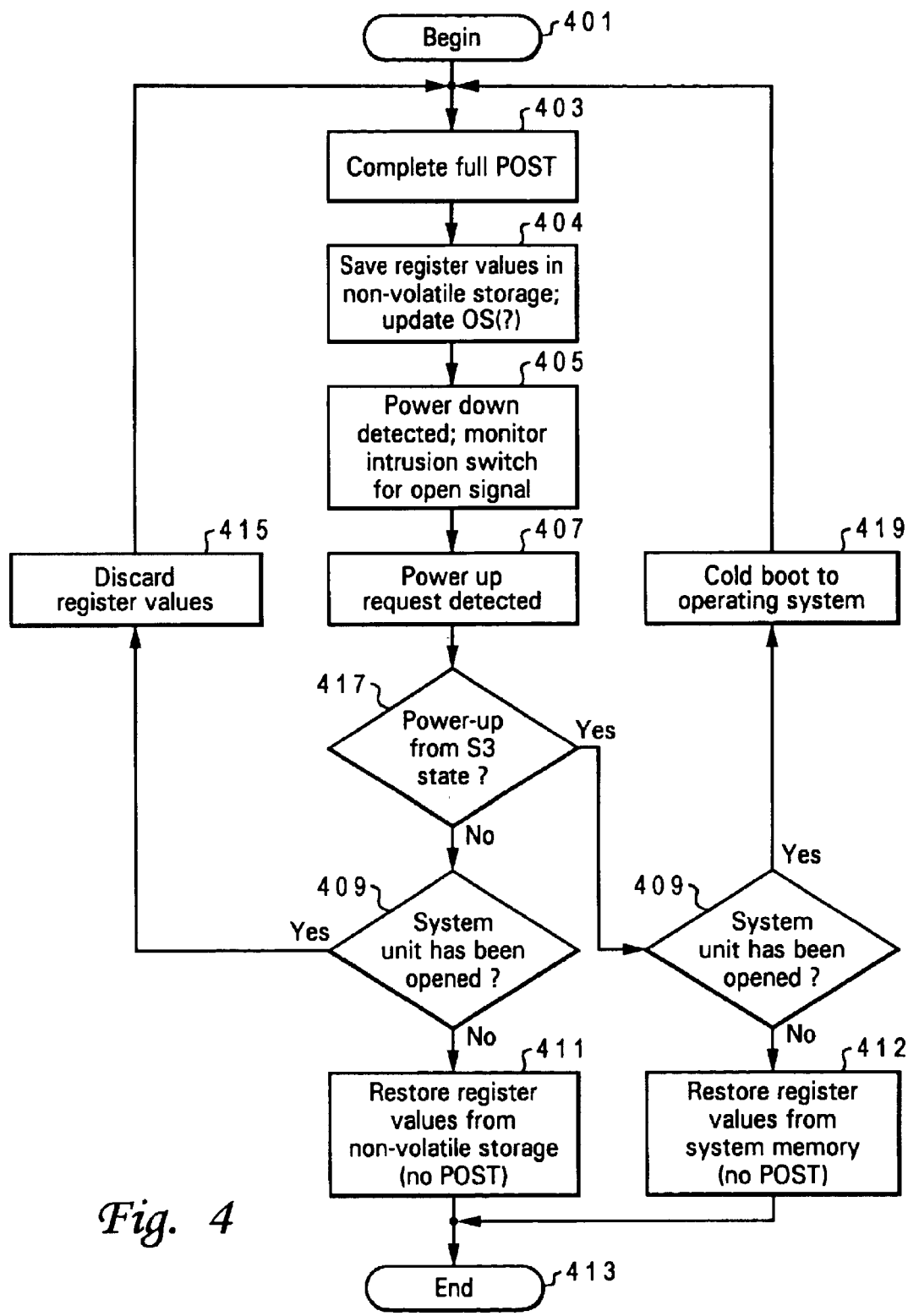
FIG. 4 is a flow chart depicting the processes included in one preferred embodiment of the present invention.

Referring now to FIG. 4, there is illustrated a flow chart of the processes of the invention. The process begins at block 401 and thereafter proceeds to block 403 where an initial BIOS POST operation is completed. All of the control register settings that are ascertained after a detailed examination of the hardware configuration during the POST operation are stored in non-volatile storage 22 (such as EEPROM or Flash Module) and OS 23 is loaded accordingly at block 404. When the computer system is later powered down at block 405, the register values remain stored in non-volatile storage 22, and the intrusion switch is monitored for a signal indicating that system unit 26 has been opened.

In the preferred embodiment, the signal is transmitted via electronic circuitry to BIOS utility 28 as soon as the switch opens (i.e., whenever the cover 110 is removed from the frame 120 of system unit 26). A preferred implementation has been presented above with reference to FIG. 5. The computer system 8 detects subsequent power-up requests at block 407, and the BIOS utility 23 determines if system unit 26 has been opened (i.e., if a signal has been received from the switch circuitry) at block 409. If system unit 26 has not been opened, BIOS utility 28 assumes that no changed has occurred in the hardware configuration and does not perform the POST operation. BIOS utility 28 skips the configuration search phase of the power up sequence, and the control register settings previously saved are fetched from the non volatile memory and loaded into their corresponding control registers at block 411. Thus, the entire boot-up process takes a relatively short period of time—less than 2 seconds. The process then ends at block 413. If, however, system unit 26 has been opened, BIOS utility 28 discards the stored register values at block 415 and triggers the full POST operation at block 403. Accordingly, a full reconfiguration operation is performed only when the system unit has been opened, eliminating the wait-on-boot time when no configuration change has occurred.

Some computer systems are designed to be able to go into S3 mode (or power suspend mode) rather than a full power-down state. With these computer systems, the process necessarily includes a determination whether the system is returning from an S3 state at block 417 and not from a full power-down. If the system returns from an S3 state and it is determined that the system unit 22 has been opened at block 409, a full POST operation is triggered at block 403. Additionally, a cold boot (or reload) to the operating system is implemented at block 419 so that the configuration changes would be addressed properly by the operating system. If, however, the computer system is returning from S3 state, but it is determined that the system unit has not been opened at block 409, BIOS utility 28 skips POST operation and restores the register values from system memory at block 412.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

The invention provides an overall time saving during power-up of the computer system. A typical personal computer system is powered up one or more times a day. With this invention, after the initial power up, all subsequent power up is completed without the time consuming POST operation unless a configuration change has occurred. In one preferred embodiment, the POST operation may also be triggered whenever the computer system crashes or errors, which may be attributed to incorrect register values or hardware configuration, occur during use of the computer system.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system with reduced power-up times, said computer system comprising:

a processor and a memory coupled to said processor;

power mechanism for powering said computer system on and off;

a non-volatile storage;

a switch circuit with a switch attached to an internal frame of said computer system and which opens when a cover of said computer system is moved from said internal frame;

means for placing said computer system in a power suspended state, wherein external power is only provided to memory modules that comprise the non-volatile storage; and a basic input/output system (BIOS) utility, which comprises:

logic for initiating a power-on self test operation during an initial power-up of said computer system, wherein system hardware configuration values are determined and stored;

logic, responsive to a subsequent request for power-up of said computer system, for completing said power-up with said power-on self test operation when said cover has been removed after said initial power-up;

logic, responsive to a subsequent request for access when said computer system is in a power suspended state, for enabling said BIOS utility to recognize that said system is in said power suspended state and, when said cover has been removed, for re-loading of an operating system of said computer system and performing a power-on self test (POST) operation;

wherein a computer system in power suspended state does not complete a fast reload of registers when re-activated by a user if the computer system has been opened, but initiates a reconfiguration of the system and a POST operation.

2. The computer system of claim 1, wherein said BIOS utility further comprises:

logic for placing said system hardware configuration values in a set of registers; and logic for storing said set of registers in said non-volatile storage.

3. The computer system of claim 2, wherein said BIOS utility further comprises logic for restoring said hardware configuration values to said set of registers from said non volatile storage during said subsequent power up.

4. The computer system of claim 1, wherein said BIOS utility further comprises:

logic for receiving an indication from said switch circuit of whether said cover has been moved; and logic for initiating said power-on self test during said subsequent power up with when said cover has been moved.

5. The computer system of claim 1, wherein:

said switch circuit includes a set-reset latch with an output provided to said BIOS; and said computer system comprising:

logic for setting said set-reset latch to a high logic level when said switch has been opened; and logic for resetting said set-reset latch to a low logic level when a power-on self test operation is being completed on said computer system by said BIOS utility.

6. The computer system of claim 5, wherein said switch circuit is powered by a battery.

7. A method for reducing power-up time of a computer system, said method comprising the steps of:

monitoring a switch circuit, wherein a switch of said switch circuit is attached to an internal part of said computer system, and said switch opens when a cover of said computer system is moved;

coupling an output of said switch circuit to a BIOS utility of said computer system, wherein said output includes a signal, which indicates that said switch has been opened;

enabling said computer system to be placed in a power suspended state, wherein external power is only provided to memory modules of non-volatile storage;

in response to a receipt of a power-up request after said signal has been received, enabling a power-up of said computer system with a power-on self test (POST) operation to check system hardware configuration; and responsive to a subsequent request for access when said computer system is in a power suspended state, enabling said BIOS utility to recognize that said system is in said power suspended state and, when said cover has been removed, performing a power-on self test (POST) operation and re-loading an operating system of said computer system;

wherein a computer system in power suspended state does not complete a fast reload of registers when re-activated by a user if the computer system has been opened, but initiates a reconfiguration of the system and a POST operation.

8. The method of claim 7, wherein said switch circuit is a set-reset latch and said method further includes the step of automatically setting said set-reset latch to a logic high when said cover has been removed.

9. The method of claim 7, further comprising the step of in response to receiving said power-up request before said signal, enabling said power-up of said computer system without running said POST operation.

10. The method of claim 9, further comprising the steps of:

determining when said computer system is in a power suspended state; and in response to determining that said computer system is in said power suspended state, loading an operating system during said power-up if said signal has been received.

11. The method of claim 10, wherein said switch circuit is a set-reset latch and said method further comprises the step of resetting said set-reset latch to a logic low during said power-up.

12. A method for reducing configuration-based crashes of a computer system, said method comprising the steps of:

determining during power suspended state if a system unit of said computer system has been opened; and in response to said determining step and receipt of a request for power-up of said computer system, initiating a full power on self test (POST) operation when said system unit has been opened and returning said computer system from said power suspended state without said POST operation when said system unit has not been opened.

13. The method of claim 12, wherein said returning step further comprises the step of loading an operating system into a memory of said computer system.

14. A method for reducing power-up time of a computer system, said method comprising the steps of:

determining during power down state if a system unit of said computer system has been opened, wherein said power down state removes power from each major system component and said determining step is completed by a switch circuit connected to a cover portion of said computer system and having an independent power source from said system components; and in response to said determining step and a request for power-up of said computer system, initiating a full power on self test (POST) operation when said system unit has been opened and powering up said computer system without completing said POST operation when said cover has remained closed, wherein a computer system powers up from a complete power down state, as well as a suspended state without completing a POST operation and wherein further said computer system completes a complete POST operation when the system has been opened during an initial power-up or suspend state prior to power down.

15. The method of claim 14, wherein said powering up step further includes the step of loading hardware configuration values for said computer system from a set of registers stored in non-volatile memory prior to a power-down of said computer system.

16. The method of claim 15, further including the step of storing said hardware configuration values in said set of registers in said non-volatile storage.

* * * * *